US005492294A

United States Patent [19]
Haeussler

[11] Patent Number: 5,492,294
[45] Date of Patent: Feb. 20, 1996

[54] LINE GUIDE BRACKET AND METHOD OF MAKING SAME

[76] Inventor: Weston W. Haeussler, 1127 E. Walnut, Garland, Tex. 75040

[21] Appl. No.: 114,024

[22] Filed: Aug. 30, 1993

[51] Int. Cl.$^6$ .................................................. G01C 15/00
[52] U.S. Cl. .................. 248/229.1; 248/300; 248/156; 248/530; 403/385
[58] Field of Search ................................. 248/229, 230, 248/218.4, 300, 156, 530, 125, 545, 541; 403/397, 389, 385, 400, 391

[56] References Cited

U.S. PATENT DOCUMENTS

| | | | |
|---|---|---|---|
| 1,987,826 | 1/1935 | Heumann | 248/229 X |
| 2,460,701 | 2/1949 | Malaspina | 248/229 |
| 2,970,798 | 2/1961 | Fritchle et al. | 248/229 |
| 3,096,110 | 7/1963 | Cantor | 403/385 |
| 3,175,262 | 3/1965 | Wilson | 248/229 |
| 3,250,009 | 5/1966 | Oseka | 33/86 |
| 3,393,547 | 7/1968 | Kortan | 72/131 |
| 3,639,942 | 2/1972 | Ostrom | 16/29 |
| 3,861,816 | 1/1975 | Zaidan | 403/385 |
| 3,883,934 | 5/1975 | Rochfort | 24/261 |
| 3,890,717 | 6/1975 | Haun | 33/86 |
| 3,923,409 | 12/1975 | Stoner | 403/290 |
| 4,102,587 | 7/1978 | Herb et al. | 403/397 X |
| 4,187,578 | 2/1980 | Little | 16/29 |
| 4,231,156 | 11/1980 | Cooper | 33/1 |
| 4,338,040 | 7/1982 | Hawkins | 403/385 |
| 4,505,608 | 3/1985 | Haldric | 403/13 |
| 4,646,552 | 3/1987 | Kanbe | 72/379 |
| 4,772,153 | 9/1988 | Huang | 403/344 |
| 4,946,122 | 8/1990 | Ramsey et al. | 248/230 X |
| 5,018,899 | 5/1991 | Kuribara | 403/57 |
| 5,035,384 | 7/1991 | Werthmann | 248/230 X |
| 5,059,053 | 10/1991 | Rose | 403/24 |

FOREIGN PATENT DOCUMENTS 604997  9/1961  Germany ............................ 248/229

Primary Examiner—Karen J. Chotkowski
Attorney, Agent, or Firm—Dennis T. Griggs

[57] ABSTRACT

A line guide bracket for adjustably coupling a holder to a ground stake is disclosed wherein the bracket is formed from flat metal sheet stock into a tubular structure and includes apertures having centering notches for accommodating ground stakes and holder arms of different diameters.

14 Claims, 4 Drawing Sheets

LINE GUIDE BRACKET AND METHOD OF MAKING SAME

FIELD OF THE INVENTION

This invention relates generally to brackets, and more particularly to a bracket for connecting a line guide holder arm onto a ground stake.

BACKGROUND OF THE INVENTION

In the preparation of a road bed, surveyor stakes are driven in the ground at spaced intervals and a line is strung between for indicating the course of the road and for indicating how much earth needs to be removed or filled at a particular location. The line guide technique may also be employed by a curb-laying machine to aid in steering the machine by providing height and azimuth direction along the roadside. It will be appreciated that the accuracy of the line guide is an important factor in roadway construction.

DESCRIPTION OF THE PRIOR ART

Typically, line guides are installed by driving ground stakes into the earth and transversely looping a line around the stakes at a preferred height. If an adjustment needs to be made, the line is slid up or down on the stake to achieve the desired height. This type of installation and adjustment causes the line to stretch and sag resulting in inaccurate position information. In an improved arrangement, a bracket fabricated from tubular metal stock is fitted around the ground stake and supports an adjustable arm for holding the line. The bracket is adjustably fastened to the ground stake for adjustment in elevation.

Conventional methods for making these brackets include machining a length of tubular metal stock by positioning and rotating the stock from side to side as holes are punched or drilled therein. Special tooling is required if the holes are punch formed in the tubular stock to permit tapping of the threads. Consequently, the tooling required to machine the line guide bracket formed from tubular metal stock is relatively expensive, and because of the multiple positioning required, production is slow. Furthermore, the tubular metal stock is relatively expensive as compared with flat metal sheet stock. Accordingly, there is a need for a line guide bracket which is easy to use, accurate, and simple to manufacture.

SUMMARY OF THE INVENTION

The present invention provides a bracket and a method of making the same for connecting a line guide holder arm to a ground stake. The bracket provides for adjustment in a direction along the axis of the ground stake as well as in a direction along the axis of the holder arm. The bracket is fabricated from flat metal sheet stock folded into four walls having apertures formed therethrough and in a general shape of a tubular structure having a rectangular cross section. Accordingly, a method is employed which includes the steps of advancing flat metal sheet stock into a punch press, punch forming a predetermined pattern of apertures and cuts therethrough, forming boss indentations on selected apertures, folding the sheet into a tubular structure, severing the tubular structure from the stock, and tapping threads in the boss indentations for receiving set screws.

ADVANTAGES OF THE INVENTION

An advantage of the present invention is that an accurate line guide bracket can be easily and inexpensively fabricated from flat metal sheet stock.

Another advantage of the present invention is that the apertures formed in the line guide bracket incorporate a centering notch for accommodating varying diameters of the holder arm and the ground stake as the respective set screws are tightened.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a specific line guide bracket and a method of making same in accordance with the principles of the present invention.

BRIEF DESCRIPTION OF THE DRAWINGS

Referring now to the drawings in which like reference numerals and letters indicate corresponding elements throughout the several views.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention. It is to be understood that the drawings are not necessarily to scale and certain aspects depicted therein may be exaggerated to illustrate the invention more clearly.

Figure 1:
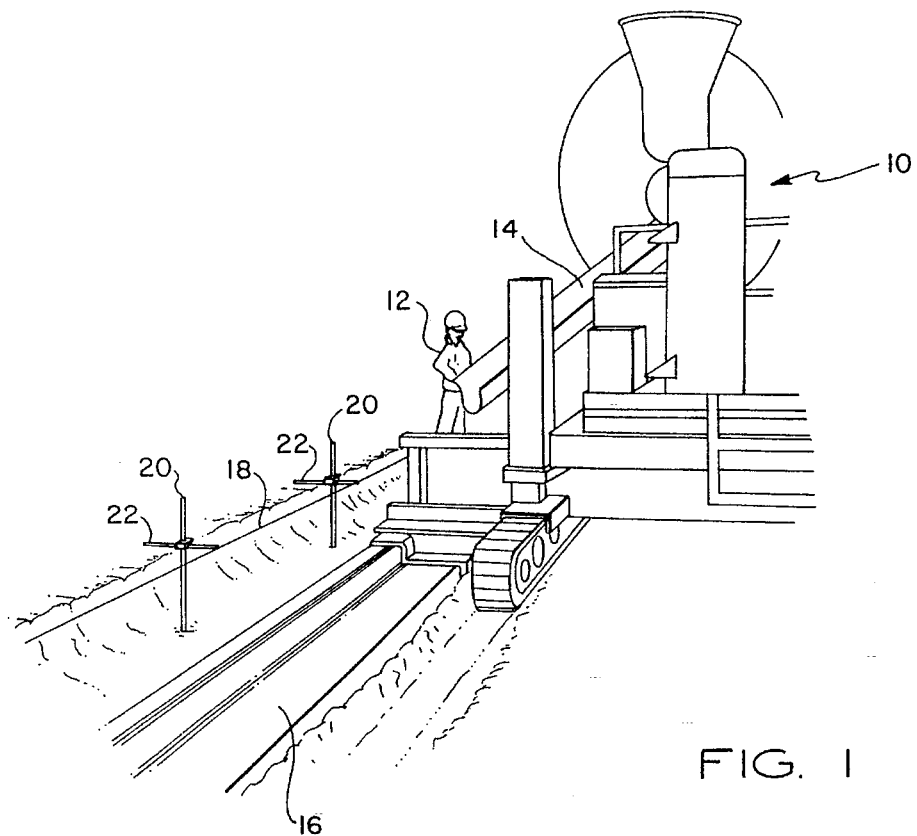
FIG. 1 depicts a perspective view of a curb-laying machine utilizing a line guide held by a line guide bracket constructed in accordance with the present invention.

Reference is now made to FIG. 1 which depicts a perspective view of a typical application for using a line guide bracket constructed in accordance with the principles of the present invention. A curb-laying machine 10 is operated by an operator 12 for pouring cement down a chute 14 to form a roadway curb 16. A line 18 is strung between a plurality of ground stakes 20 which have attached thereon a line guide holder arm 22 for holding the line 18. The curb-laying machine 10 is guided in vertical and azimuth directions by the line 18 which is sensed manually by the operator 12 or by an automatic sensing means incorporated into the curb-laying machine 10. It is to be understood that the exact technique for sensing the line 18 is not necessary for the understanding of the present invention.

Figure 2:
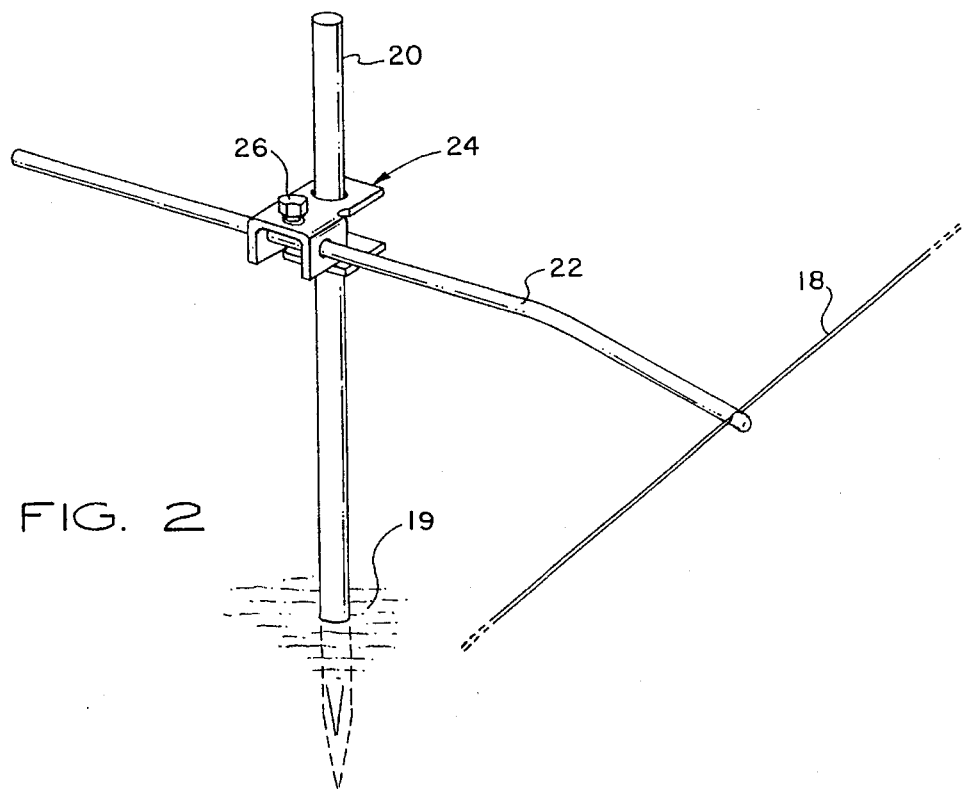
FIG. 2 depicts a perspective view of the ground stake and a line guide holder arm coupled together with the line guide bracket of the present invention.
Figure 3:
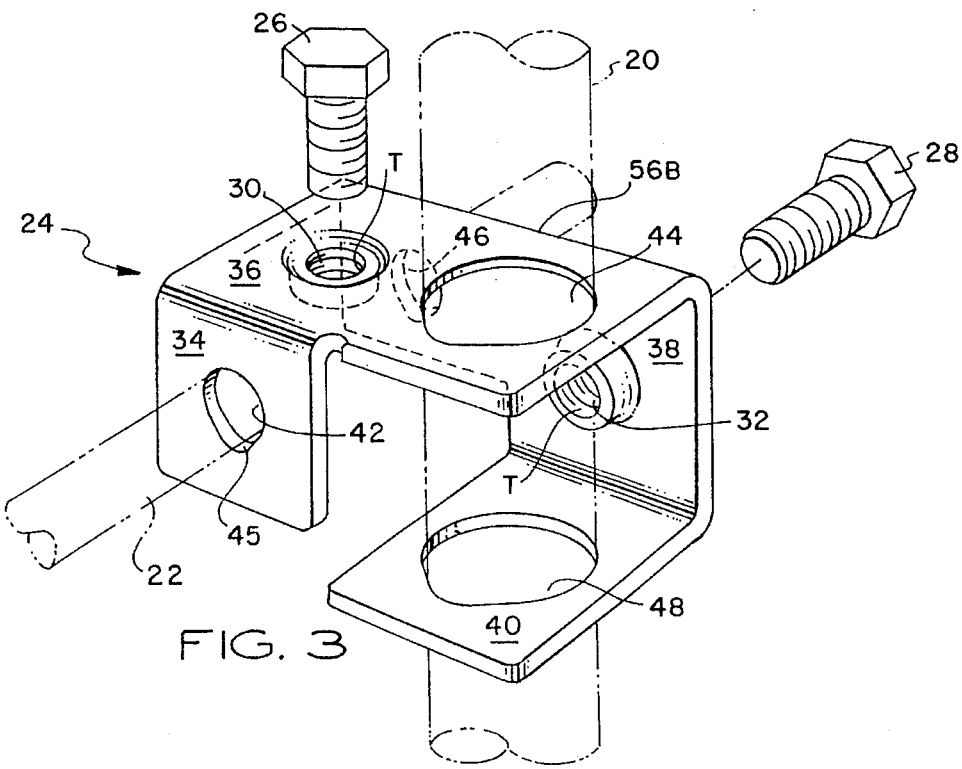
FIG. 3 depicts an exploded view of the line guide bracket constructed in accordance with the principles of the present invention.
Figure 4:
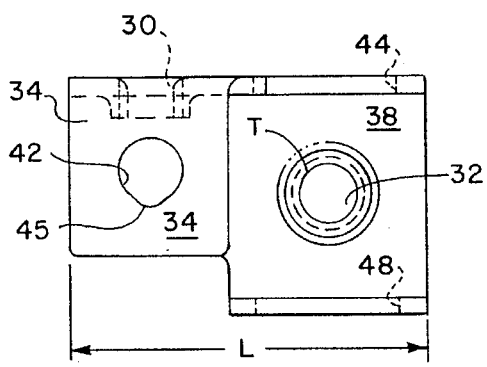
FIG. 4 depicts a front plan view of the line guide bracket constructed in accordance with the principles of the present invention.
Figure 5:
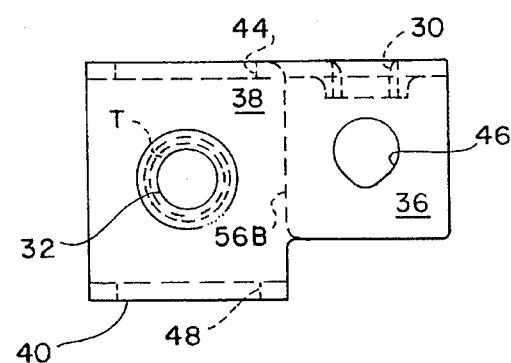
FIG. 5 depicts a rear plan view of the line guide bracket constructed in accordance with the principles of the present invention.

Reference is now made to FIG. 2 which depicts a more detailed perspective view of the ground stake 20 coupled to the line guide holder arm 22 with the bracket 24 constructed in accordance with the principles of the present invention. The ground stake 20 and the line guide holder arm 22 preferably have a generally cylindrical shape and extend substantially perpendicular to one another. Preferably, the ground stake 20 is of a large enough diameter to withstand the insertion blows applied in driving it into the earth 19. The line guide holder arm 22 is adjustably positioned horizontally through the bracket 24 and held in place with a first set screw 26. The line guide bracket 24 is vertically adjustable about the ground stake 20 and is fixed into place with a second set screw 28 shown in FIG. 3. The first and second set screws 26 and 28 are threaded into threaded apertures 30 and 32 respectively, which are tapped with mating threads to the set screws 26 and 28, all described in more detail hereinbelow.

Figure 6:
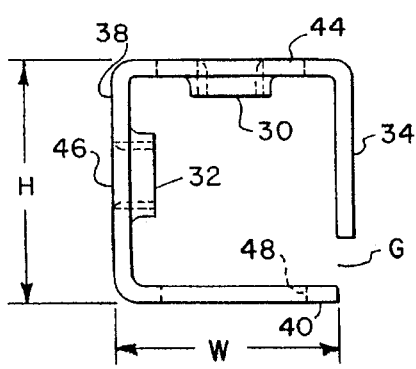
FIG. 6 depicts a first side view of the line guide bracket constructed in accordance with the principles of the present invention.
Figure 7:
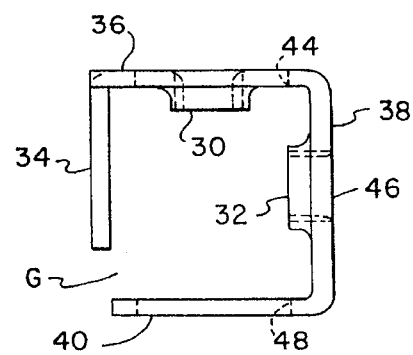
FIG. 7 depicts a second side view of the line guide bracket constructed in accordance with the principles of the present invention.
Figure 8:
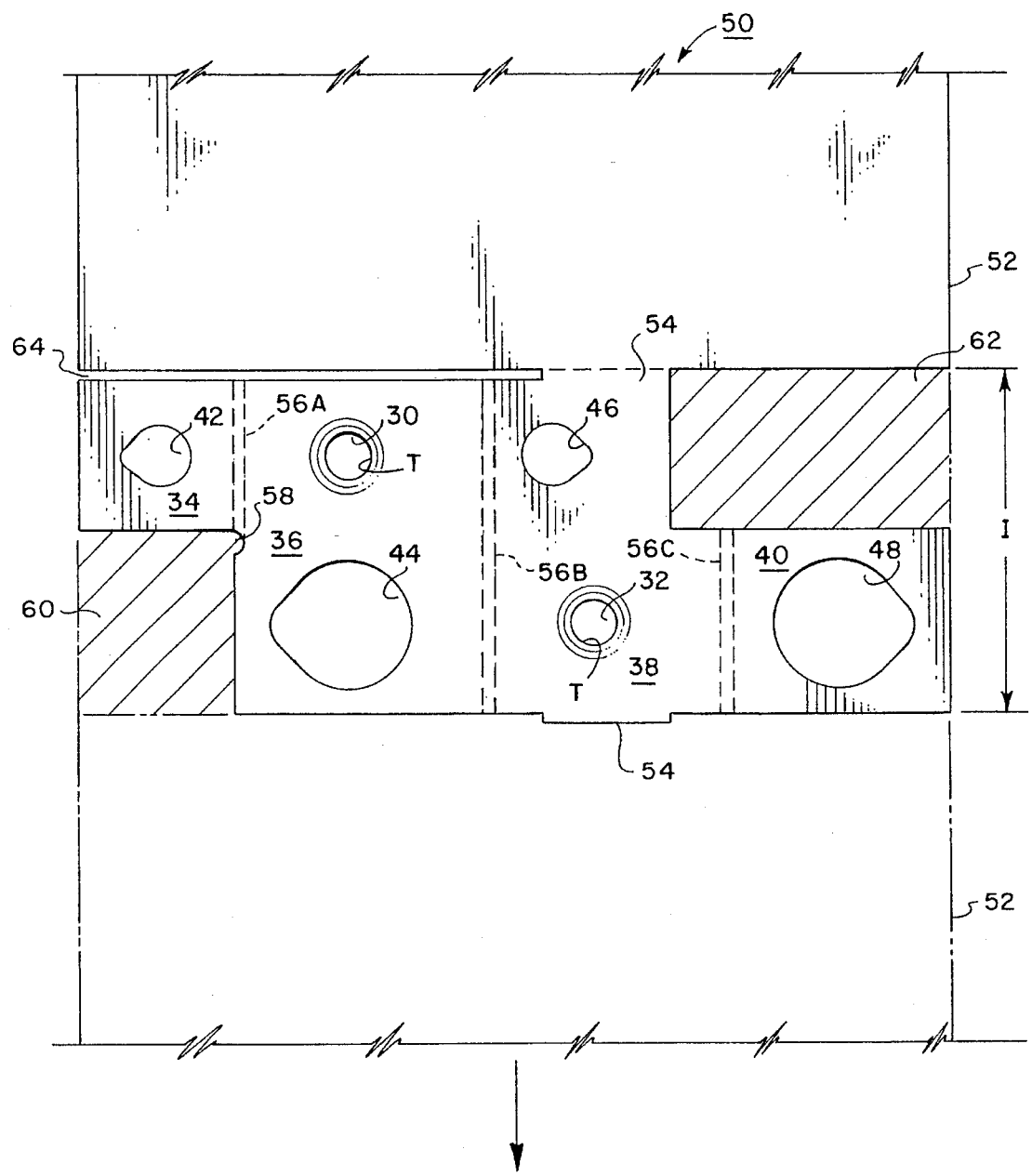
FIG. 8 depicts a section of flat metal sheet stock having cuts and apertures punch formed therethrough in a preferred pattern.

Referring to FIGS. 3–7, the bracket 24 includes a front wall 34 extending downwardly and generally at a right angle to a top wall 36 which spans a length L. A rear wall 38 extends downwardly from the top wall 36 at substantially a right angle in a plane parallel to the front wall 34 and defines a height H. A bottom wall 40 extends outwardly at substantially a right angle from the rear wall 38 in a plane parallel to the top wall 36 and defines a width W. The front wall 34 includes a first aperture 42 generally in a circular shape. A centering notch 45 is formed in the first aperture 42 as well as in the other apertures described hereinbelow, so that holder arm 22 will center within the aperture 42 as the set screw 26 is tightened. The top wall 36 includes the threaded aperture 30 for engaging the set screw 26 and a stake aperture 44 including a centering notch, for accepting the ground stake 20 which passes therethrough. The rear wall 38 includes the threaded aperture 32 for engaging the set screw 28 and an aperture 46 including the centering notch, which is coaxial and identical in dimensions to the first aperture 42. The line guide holder arm 22 is adjustably supported by the apertures 42 and 46 and is fixedly centered and set by the applied force of the set screw 26 so that the holder arm is wedged in the notch 45 of apertures 42 and 46. The bottom wall 40 includes a mating aperture 48 coaxial to the aperture 44 through which the ground stake 20 passes therethrough. Similar to the apertures 42 and 46, the apertures 44 and 48 each have a centering notch 45 formed therein. The centering notches accommodate varying diameters of the ground stake 20 forcing the ground stake 20 to center in the notches as the set screw 28 is tightened. Referring again to FIG. 3, the front wall 34 extends generally in parallel with the rear wall 38, and transversely with respect to the bottom wall 40. The front wall and the bottom wall 40 are completely separated by an air gap G, as shown in FIG. 6 and FIG. 7. The separation of the front wall 34 with respect to the bottom wall 40 is intentional and is brought about as a result of the fabrication process discussed below. The walls 34, 36, 38 and 40 are connected to each other only along the fold lines 56A, 56B and 56C as shown in FIG. 8. The front wall 34 is connected to the top wall 36 and is separated from the bottom wall by the air gap G.

Reference is now made to FIG. 8 which depicts a section of flat metal sheet stock 50 having various apertures and cuts punched formed therethrough. A plurality of sheet metal blanks 52 of incremental length I are coupled together by a break off tab 54 so that the sheet stock 50 can be continuously rolled through a punch press. The incremental length I is the distance that the punch press advances after punching the blank 52. A plurality of fold lines 56A, 56B and 56C which are depicted in dashed, form the joining edges of the walls 34, 36, 38 and 40 respectively. A bend relief notch 58 is punch formed at the lower corner of the fold line 56A where the front wall 34 and top wall 36 join together. The bend relief notch 58 relieves stress as the front wall 34 is folded into the page at a right angle along the fold line 56A as viewed from FIG. 8. Likewise, the top wall 36 is folded at a right angle into the page with respect to the rear wall 38 along the fold line 56B and the rear wall 40 is folded at a right angle into the page with respect to the bottom wall 40 along the fold line 56C.

The punched blank of incremental length I has a first piece of material 60 removed from the lower left hand corner and a second piece of material 62 removed from the upper right hand corner. A cut 64 is formed at the upper left hand corner which extends substantially horizontal to a point approximately midpoint across the punched blank. The removal of materials 60 and 62 and the cut 64 allow the walls 34, 36, 38 and 40 to be folded along fold lines 56A–56C into the tubular structure depicted in FIG. 3.

Figure 9:
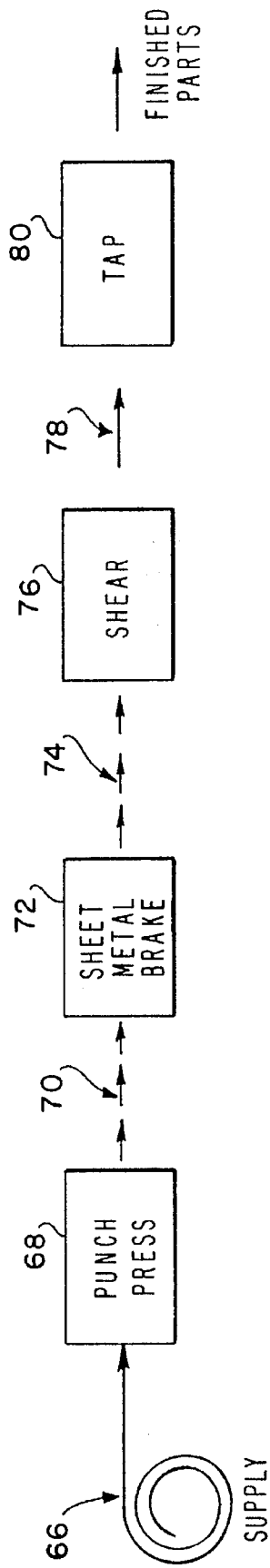
FIG. 9 depicts a block diagram illustrating steps for fabricating the line guide bracket of the present invention.

Reference is now made to FIG. 9 which depicts a block diagram of a method of manufacturing the line guide bracket 24 practiced in accordance with the principles of the present invention. A supply of flat metal sheet stock stored in roll form 66 is advanced through a punch press 68. The punch press 68 includes a tool and a die which punch form the apertures 30, 32, 42, 44, 46 and 48, the cut 64, and the removed materials 60 and 62 so that the blank 52 is suitable for folding into the tubular structure. The die includes dimples so that boss indentations suitable for tapped threads are punch formed on the apertures 30 and 32. The output 70 of the punch press 68 is fed into a sheet metal bending brake 72 which bends the punched form blank into the generally tubular shape structure. The tubular structures remain connected to each other at the tab 54. The output 74 of the bending brake 72 is fed into a shear 76 which separates the tubular structures by cutting the tab 54. At the output 78 of the shear 76, the embossed apertures 30 and 32 have threads T machined therein by a tap 80.

All the folding and shearing is done in the die in the punch press at different stages (5 stage die). Tapping is the only secondary operation.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A bracket for connecting a line guide holder arm onto a ground stake, comprising:

front, top, rear, and bottom walls formed from a blank of flat metal sheet stock folded along three edges into a generally rectangular configuration with the front wall being connected to the top wall and separated from the bottom wall by an air gap;

the front wall being intersected by a first aperture for receiving a line guide holder arm;

the top wall extending at a substantially right angle extending transversely to the front wall and being intersected by a second aperture, the second aperture including a threaded sidewall, and being intersected by a third aperture for receiving a ground stake;

the rear wall extending transversely to the top wall and in a plane substantially parallel to the front wall, the rear wall being intersected by a fourth aperture and a fifth aperture, the fourth aperture having an axis coaxial to the first aperture for receiving a line guide holder, and the fifth aperture including a threaded sidewall; and the bottom wall transversely to the rear wall in a plane substantially parallel to the top wall, the rear wall being intersected by a sixth aperture having an axis coaxial with the third aperture for receiving a ground stake.

2. A bracket as recited in claim 1 further including a first set screw and a second set screw coupled to the threaded sidewalls of the second and the fifth apertures respectively, for retaining a line guide holder arm and a ground stake in a fixed position, respectively.

3. A bracket as recited in claim 2 wherein the first and the fourth apertures each include a notch for centering the line guide holder arm as the first set screw is tightened into the threaded sidewalls of the second aperture.

4. A bracket as recited in claim 2 where the third and sixth apertures each include a notch for centering the ground stake as the second set screw is tightened into the threaded sidewalls of the fifth aperture.

5. A bracket as recited in claim 1 further including a bend relief notch formed between the front and the top walls.

6. A bracket as recited in claim 1 wherein the flat metal sheet stock has a thickness of substantially one-eighth of an inch.

7. A bracket as recited in claim 1 wherein the second aperture on the top wall is substantially centered between the front and the rear walls.

8. A bracket as recited in claim 1 wherein the fifth aperture on the rear wall is substantially centered between the top and the bottom walls.

9. A method for manufacturing a connecting bracket as defined in claim 1, the method comprising the steps:

(a) feeding metal sheet stock into a punch press;

(b) punch forming a predetermined pattern of cuts and apertures including first, second, third, fourth, fifth and sixth apertures in a blank section of the sheet stock and embossing two of the apertures to form sidewalls therein;

(c) shearing the punched blank from the sheet stock;

(d) folding the punched blank along three fold lines thereby defining front, top, rear and bottom walls disposed in a generally rectangular configuration with the front wall being connected to the top wall and being separated from the bottom wall by an air gap; and (e) tapping threads in the sidewalls of the two embossed apertures formed in step (b).

10. A method for manufacturing a bracket as recited in claim 9 wherein step (b) further includes notching at least two of the apertures.

11. A method for manufacturing a bracket as recited in claim 9 wherein step (b) further includes notching four of the apertures.

12. A method for manufacturing a bracket as recited in claim 9 wherein step (b) further includes cutting a bend relief notch in the sheet stock for relieving stress as the sheet stock is folded into the generally tubular structure in step (c).

13. A method for manufacturing a line guide bracket as recited in claim 9 wherein the metal sheet stock is stored in roll form as the stock is fed into the punch press.

14. A method for manufacturing a bracket as recited in claim 9 further including the step of advancing the sheet stock a predetermined distance and repeating steps (a)–(e).

* * * * *